US008435433B2

(12) United States Patent
Pennell et al.

(10) Patent No.: US 8,435,433 B2

(45) Date of Patent: May 7, 2013

(54) METHOD FOR MAKING A HANDLE FOR A PERSONAL GROOMING DEVICE

(75) Inventors: Evan Kent Pennell, Hingham, MA (US); Alejandro Carlos Lee, Cambridge, MA (US)

(73) Assignee: The Gillette Company, Boston, MA (US)

( * ) Notice: Subject to any disclaimer, the term of this patent is extended or adjusted under 35 U.S.C. 154(b) by 773 days.

(21) Appl. No.: 12/349,553

(22) Filed: Jan. 7, 2009

(65) Prior Publication Data

US 2009/0193600 A1 Aug. 6, 2009

Related U.S. Application Data

(60) Provisional application No. 61/025,998, filed on Feb. 4, 2008.

(51) Int. Cl.
*B29C 45/14* (2006.01)

(52) U.S. Cl.
USPC ........... 264/250; 264/243; 264/263; 264/275; 264/247

(58) Field of Classification Search ........................ None
See application file for complete search history.

(56) References Cited

U.S. PATENT DOCUMENTS

| | | | | |
|---|---|---|---|---|
| 5,630,244 | A * | 5/1997 | Chang | 15/167.1 |
| 5,769,506 | A * | 6/1998 | Boucherie | 300/2 |
| 5,934,762 | A * | 8/1999 | Vrignaud | 300/21 |
| 6,298,516 | B1 * | 10/2001 | Beals et al. | 15/143.1 |
| 6,641,764 | B2 * | 11/2003 | Lanvers | 264/157 |
| 7,383,619 | B2 * | 6/2008 | Gross et al. | 16/430 |
| 2005/0044646 | A1 * | 3/2005 | Peretz et al. | 15/143.1 |
| 2006/0118130 | A1 * | 6/2006 | Little et al. | 132/147 |
| 2006/0230652 | A1 * | 10/2006 | Little | 40/314 |
| 2007/0186453 | A1 * | 8/2007 | Little et al. | 40/314 |

OTHER PUBLICATIONS

PCT International Search Report with Written Opinion in corresponding Int'l appln. PCT/IB2009/050412 dated May 15, 2009 (14 pgs).

* cited by examiner

*Primary Examiner* — Edmund H. Lee

(74) *Attorney, Agent, or Firm* — Joanne N. Pappas; Kevin C. Johnson; Steven W. Miller

(57) ABSTRACT

A method of manufacturing a handle for a personal grooming device includes forming a substrate portion of a first material. The substrate portion has first and second walls forming a channel extending along a long axis of the substrate portion. An insert member is formed separate from the substrate portion and disposed within the channel. A grip portion of a second material is formed on the substrate portion. The second material substantially encases the insert member.

14 Claims, 3 Drawing Sheets

METHOD FOR MAKING A HANDLE FOR A PERSONAL GROOMING DEVICE

CROSS REFERENCE TO RELATED APPLICATIONS

This application claims priority under 35 U.S.C. §119(e) from U.S. Provisional Patent Application Ser. No. 61/025,998, filed Feb. 4, 2008.

FIELD OF THE INVENTION

This application relates to handles for personal grooming devices and methods of manufacturing the same.

BACKGROUND OF THE INVENTION

Handles for personal grooming devices are well known. Some device handles are formed by a "two-color" injection molding process combining a relatively rigid material with a relatively flexible material. The combination of rigid and flexible materials may improve the ergonomics associated with such handles and provide an improved shaving experience over single material handles. Some personal grooming device handles have relatively large cross sections for improved handling and comfort while being used. Larger cross sections may require longer cycle times during molding to completely fill out the mold cavities and avoiding sinks in the handle material during cooling. In one example, a rigid inner core is molded in a first mold cavity and a second layer of rigid material is molded over the inner core in a second mold cavity. A flexible grip portion is molded onto the second layer in a third cavity. All three cavities are contained in the same mold. The parts are moved from cavity to cavity by in-mold automation. In another example, a device handle has a rigid first molded portion, a flexible second molded portion, and a battery-operated device that is at least partially encased between the first and second molded portions.

Some personal grooming devices are disposable in that they are meant to be discarded when they no longer provide an adequate grooming experience. Disposable personal grooming devices must strike a balance between its price and the quality of the grooming experience. Lowering manufacturing costs of disposable personal grooming devices without sacrificing features that contribute to the quality of the grooming experience represents an unmet need in the marketplace. While disposable personal grooming devices are more price sensitive than so-called "system" devices (e.g., a safety razor shaving system having a reusable razor handle and detachable, disposable blade units), such system devices may also benefit from lower manufacturing costs.

SUMMARY OF THE INVENTION

The invention relates to handles for personal grooming devices and methods of manufacturing the same.

In one aspect, the invention features, in general, a method of manufacturing a handle for a personal grooming device including forming a substrate portion of a first material. The substrate portion has first and second walls forming a channel extending along a long axis of the substrate portion. An insert member is formed separate from the substrate portion and disposed within the channel. A grip portion of a second material is formed on the substrate portion. The second material substantially encases the insert member.

In another aspect, the invention features, in general, a handle for a personal grooming device. The handle has a substrate member comprising a channel, an insert member disposed within the channel, and a grip portion disposed on the substrate member and substantially encasing the insert member. A tower portion extends through an exterior surface of the grip portion.

Certain implementations of the invention may include one or more of the following features. The substrate portion has a rib portion transversely extending between the first and second walls. The insert member has a slot sized to receive the rib portion and disposing the insert member within the channel includes inserting the rib portion into the slot. The insert member has a hook portion. Disposing includes hooking the hook portion onto the substrate portion. The insert member has a finger portion projecting from an upper surface. Disposing the insert member within the channel includes clamping the finger portion to fix its position within the channel during forming of the grip portion. The substrate portion includes a tower portion disposed between the first and second walls and extending from the joined portion. The tower portion has a top surface. The insert member includes an opening sized to accommodate the tower portion and disposing the insert member within the channel includes inserting tower into the opening. The top surface is at least substantially flush with an exterior surface of the grip portion. The grip portion completely encases the insert member. The substrate portion is formed of a rigid material. The substrate portion is formed of a polyethylene plastic. The grip portion is formed of a thermoplastic elastomer. The substrate portion includes a blade unit connecting portion. The blade unit connecting portion comprises tab member forming a first snap fit recess in a top surface thereof and forming a second snap fit recess in a bottom surface thereof.

Features of the present invention may have one or more of the following advantages. The cross-sections of the three component parts allow for faster cycle times and, thus lower manufacturing costs over more commonly known two part handles of similar size and ergonomics. The parts may be assembled by hand, avoiding expensive handling and assembly equipment, thereby further reducing the manufacturing costs.

DETAILED DESCRIPTION OF THE INVENTION

Figure 1:
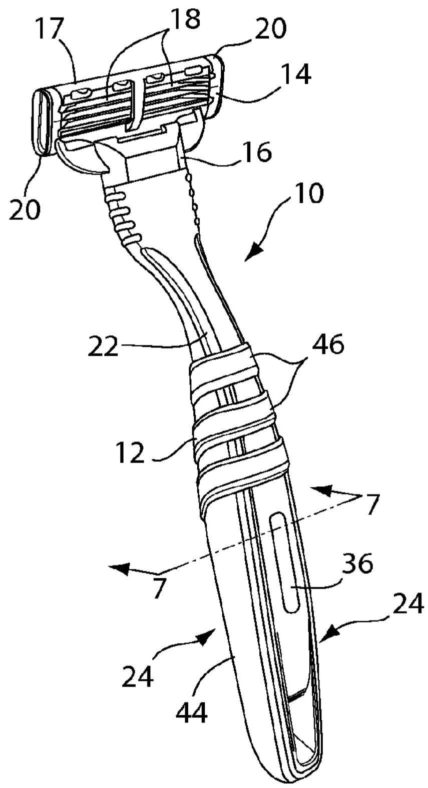
FIG. 1 is an isometric view of an exemplary safety razor of the present invention.
Figure 2:
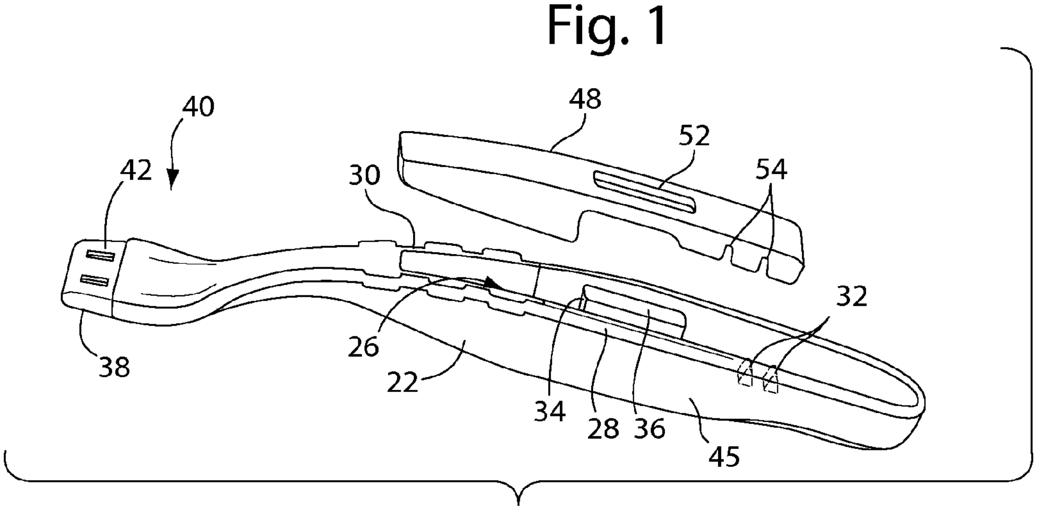
FIG. 2 is an exploded isometric view of an exemplary handle and insert of the present invention.

Referring to FIGS. 1 and 2, in some examples, safety razor 10 includes a handle 12 pivotally joined to a blade unit 14 by a connecting member 16. Blade unit 14 includes a plastic housing 17 and three blades 18 each with an elongated sharp cutting edge between a guard at the front of the housing and a cap with a lubricating strip at the rear of the housing and retained by clips 20. In other examples, two, four, five, or more blades could be included. In one example, blade unit 14 is similar to that of the Mach III razor, sold by The Gillette Company.

Handle 12 has a core portion 22 at least partially enclosed by a grip portion 24. Generally, core portion 22 may have a substantially consistent cross-section for good plastic flow, filling, and cooling during molding, as is understood in the art. In some examples, core portion 22 has a channel 26 extending along its length and formed by walls 28 and 30. One or more ribs 32 (shown in broken line in FIG. 2) may extend between walls 28 and 30 to provide rigidity and to interact with other elements as described below. In one example, a tower portion 34 projects upwardly from a bottom surface 35 (FIGS. 5-7) of the channel 26 to a surface 36 for displaying information to a consumer. An attachment member 38 may be disposed at a distal end 40 of core portion 22 and form openings 42 for use with the blade unit 14 and/or connecting member 16, such as for snap fit or blade unit biasing elements.

Grip portion 24 forms the body portion 44 of handle 12 by filling channel 26 and at least partially enclosing exterior 45 of core portion 22. Grip portion 24 may form gripping elements to enhance a user's shaving experience, such as bands 46 or other elements, such as bumps, ridges, ribs, and fins, for example. Body portion 44 should be wide enough to be comfortably held by a range of adult hands. In one example, body portion 44 has a width W of about 0.65 inches, while in other examples, the width W may be about 0.40, 0.45, 0.50, 0.55, 0.60, 0.70, 0.75 or 0.80 inches. Those skilled in the art will understand that plastic parts with thick cross sections take longer to mold and require larger molding presses to manufacture, increasing the cost of such parts.

Figure 5:
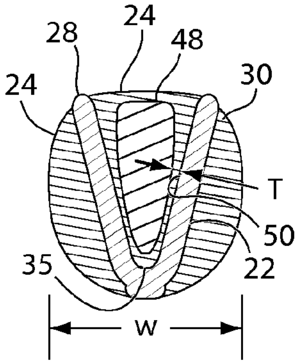
FIG. 5 is section view of a mold cavity forming the handle of FIG. 2.

Referring to FIGS. 2 and 5, core member 48 is disposed in channel 26, thereby reducing the cross-sectional area thereof into which grip portion 24 will be formed. Adding core member 48 improves manufacturability by decreasing molding cycle times of grip portion 24, as will be understood by those skilled in the art. In one example, the thickness T of wall 50 is about 0.05 inches while in other examples, the thickness T may be about 0.03, 0.04, 0.06, 0.07, or 0.08 inches. In still other examples, insert member 48 could contact walls 28 and 30, preventing grip portion 24 from completely enclosing core member 48.

Figure 3:
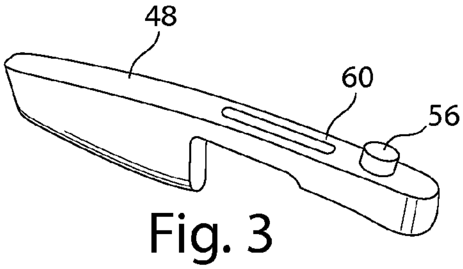
FIG. 3 is an isometric view of a second exemplary insert of the present invention.
Figure 4:
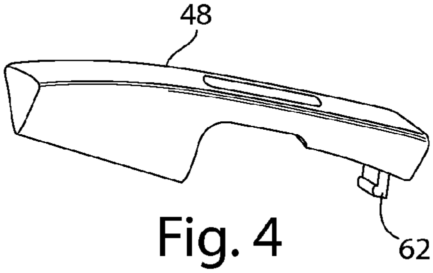
FIG. 4 is an isometric view of a third exemplary insert of the present invention.

Insert member 48 forms opening 52 sized to receive tower portion 34 and slots 54 sized to receive ribs 32. An interference fit between these features of insert member 48 and core portion 22 keeps the two assembled until grip portion 24 is formed about them. In other examples, insert member 48 includes a post 56 (FIG. 3) projecting upwardly from an upper surface 60 that may be used to hold the position of insert member 48 in the desired relation to core portion 22 while grip portion 24 is formed. In still other examples, snap arm 62 (FIG. 4) may downwardly project from insert member 48 for snapping into features of core portion 22 (not shown).

In some examples, core portion 22 and insert member 48 are formed of a relatively rigid plastic, such as HP741T polypropylene, available from Basell Polyolefin Corp. (Hoofddorp, The Netherlands). Grip portion 24 is formed of a relatively flexible thermoplastic elastomer, such as LC316-110A available from GLS Polymers Pvt. Ltd (Bangalore, India). However, any suitable combination of materials may be used, including different materials for core portion 22 and insert member 48.

Figure 6:
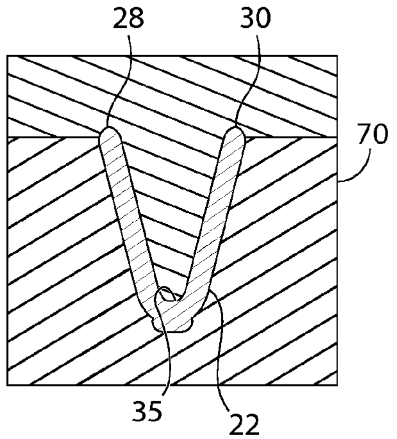
FIG. 6 is section view of a mold cavity for forming the grip of FIG. 1.
Figure 7:
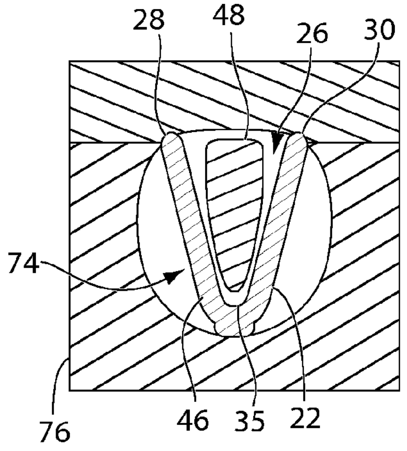
FIG. 7 is section view of the safety razor handle of FIG. 1.

Referring to FIGS. 5-7, a method of manufacturing handle 12 is shown. Core portion 22 is formed in and then removed from mold 70. In some examples, insert member 48 is formed separately in another mold, which avoids having to separate the parts if they were made in the same mold, while in other examples, core portion 22 may be formed in mold 70. Core portion 22 and insert member 48 are assembled into assembly 74 by passing tower portion 34 into opening 52 and pressing ribs 32 into slots 54. In some examples, assembly 74 is manually assembled to keep capital equipment costs low, while in other examples, assembly 74 may be assembled by automated equipment. Assembly 74 is placed in mold 76 and grip portion 24 is injection molded around it, substantially encasing insert member 48. In some examples, grip portion 24 may completely encase insert member 48.

Alternative embodiments are within the scope of the claims.

Figure 8:
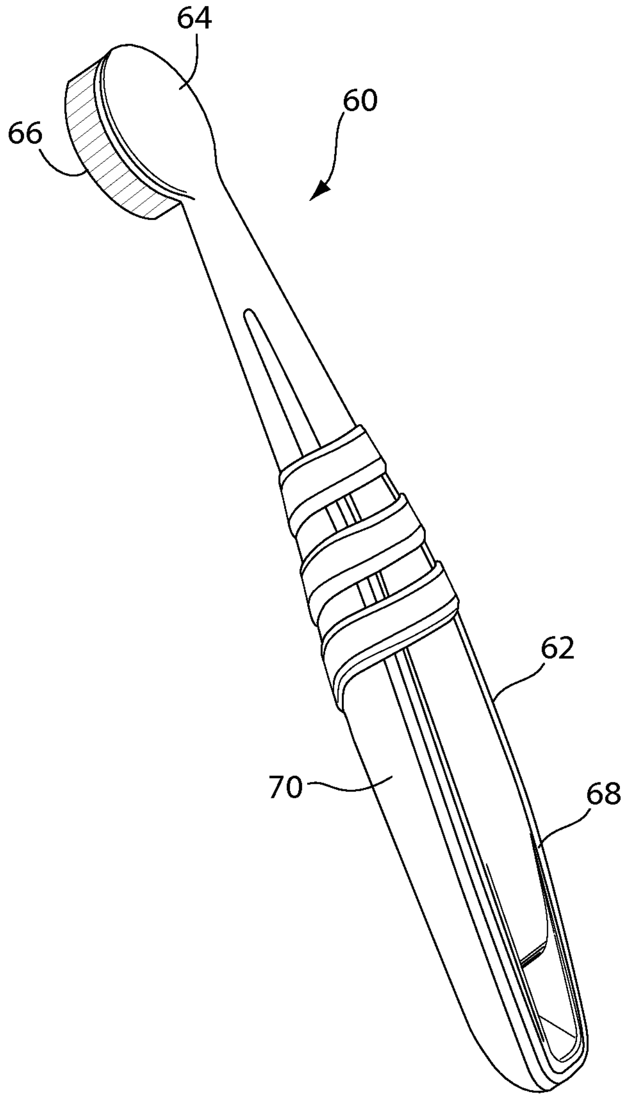
FIG. 8 is an isometric view of an exemplary toothbrush of the present invention.

For example, referring to FIG. 8, toothbrush 60 has a handle portion 62 and a head portion 64 having bristles 66 for brushing teeth. Substrate portion 68 and an insert member (not shown) are at least partially enclosed by a grip portion 70. Head portion 64 may be formed from substrate portion 68, grip portion 70, or some combination thereof.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of manufacturing a handle for a personal grooming device, the method comprising:

forming a substrate portion of a first material, the substrate portion comprising first and second walls forming a channel extending along a longitudinal axis of the substrate portion;

forming an insert member separate from the substrate portion;

disposing the insert member within the channel;

forming a grip portion of a second material on the substrate portion, the second material substantially encasing the insert member wherein the substrate portion comprises a tower portion disposed within the channel between the first and second walls and extending from a surface of the channel, the tower portion comprising an exposed top surface coplanar with a top surface of the handle.

2. The method of claim 1, wherein the substrate portion comprises a rib portion transversely extending between the first and second walls.

3. The method of claim 2, wherein the insert member comprises a slot sized to receive the rib portion and disposing the insert member within the channel comprises inserting the rib portion into the slot.

4. The method of claim 1, wherein the insert member comprises a hook portion and disposing comprises snapping the hook portion onto the substrate portion.

5. The method of claim 1, wherein the insert member comprises a finger portion projecting from an upper surface thereof and disposing the insert member within the channel comprises clamping the finger portion to fix its position within the channel during forming of the grip portion.

6. The method of claim 1, wherein the insert member includes an opening sized to accommodate the tower portion and disposing the insert member within the channel comprises inserting the tower portion into the opening.

7. The method of claim 1, wherein the top surface is at least substantially flush with an exterior surface of the grip portion.

8. The method of claim 1, wherein the grip portion completely encases the insert member.

9. The method of claim 1, wherein the substrate portion is formed of a rigid material.

10. The method of claim 9, wherein the substrate portion is formed of a polypropylene.

11. The method of claim 1, wherein the grip portion is formed of an elastomer.

12. The method of claim 1, wherein the substrate portion further comprises a blade unit connecting portion.

13. The method of claim 12, wherein the blade unit connecting portion comprises tab member forming a first snap fit recess in a top surface thereof and forming a second snap fit recess in a bottom surface thereof.

14. The method of claim 1, wherein the substrate portion further comprises a bristle connecting portion.

* * * * *